United States Patent
Retana et al.

(10) Patent No.: US 7,860,027 B2
(45) Date of Patent: Dec. 28, 2010

(54) EXTENDING AN IP EVERYWHERE NETWORK OVER A PLURALITY OF FLOODING DOMAINS

(75) Inventors: Alvaro E. Retana, Raleigh, NC (US); Russ White, Holly Springs, NC (US)

(73) Assignee: Cisco Technology, Inc., San Jose, CA (US)

(*) Notice: Subject to any disclaimer, the term of this patent is extended or adjusted under 35 U.S.C. 154(b) by 340 days.

(21) Appl. No.: 11/944,391

(22) Filed: Nov. 21, 2007

(65) Prior Publication Data

US 2009/0129387 A1    May 21, 2009

(51) Int. Cl.
*H04L 12/28* (2006.01)
(52) U.S. Cl. .................. 370/254; 370/392; 370/546
(58) Field of Classification Search ........ 370/254, 370/392, 393, 395.3, 395.31, 395.52, 395.54, 370/397, 399, 546
See application file for complete search history.

(56) References Cited

U.S. PATENT DOCUMENTS

| | | | |
|---|---|---|---|
| 7,139,838 B1 * | 11/2006 | Squire et al. | 709/242 |
| 2002/0057657 A1 * | 5/2002 | La Porta et al. | 370/331 |
| 2003/0014540 A1 * | 1/2003 | Sultan et al. | 709/240 |
| 2004/0174825 A1 * | 9/2004 | Li et al. | 370/254 |
| 2005/0271038 A1 * | 12/2005 | Xin et al. | 370/351 |
| 2006/0018313 A1 * | 1/2006 | Oki et al. | 370/389 |
| 2007/0165532 A1 * | 7/2007 | Retana et al. | 370/241 |
| 2008/0025270 A1 * | 1/2008 | Moon | 370/338 |

OTHER PUBLICATIONS

Murphy, P., The OSPF Not-So-Stubby Area (NSSA) Option, Internet proposed standard RFC 3101, Jan. 2003.
Stolowitz Ford Cowger LLP, Listing of Related Cases, Mar. 29, 2010.

* cited by examiner

*Primary Examiner*—Dang T Ton
*Assistant Examiner*—Robert M Morlan
(74) *Attorney, Agent, or Firm*—Stolowitz Ford Cowger LLP

(57) ABSTRACT

In one embodiment, a border node receives a message that includes routing information indicating connection of a network device to a domain. The border node then updates a routing database with the routing information, and also uses a network address for the network device to determine whether to propagate the routing information.

18 Claims, 4 Drawing Sheets

EXTENDING AN IP EVERYWHERE NETWORK OVER A PLURALITY OF FLOODING DOMAINS

TECHNICAL FIELD

The present disclosure relates generally to the field of networking.

BACKGROUND

Packet switched networks utilize link-state protocols such as Open Shortest Path First (OSPF) to enable routers within the network to exchange network topology information needed to communicate with each other. These link-state protocols utilize an architecture that logically segments the network topology into different flooding domains, which allows scaling over extensive network topologies. To minimize traffic overhead produced by the routers maintaining the network topology information, these link-state protocols define different link state advertisement message types that are selectable for controlling how extensively routing information is propagated over the different flooding domains.

Internet Protocol everywhere (IPe) provides numerous features including allowing an IPe device to retain its network address after movement within the IPe network. Routing problems can occur when an IPe network is extended over more than one flooding domain.

DESCRIPTION OF EXAMPLE EMBODIMENTS

Overview

Figure 1:
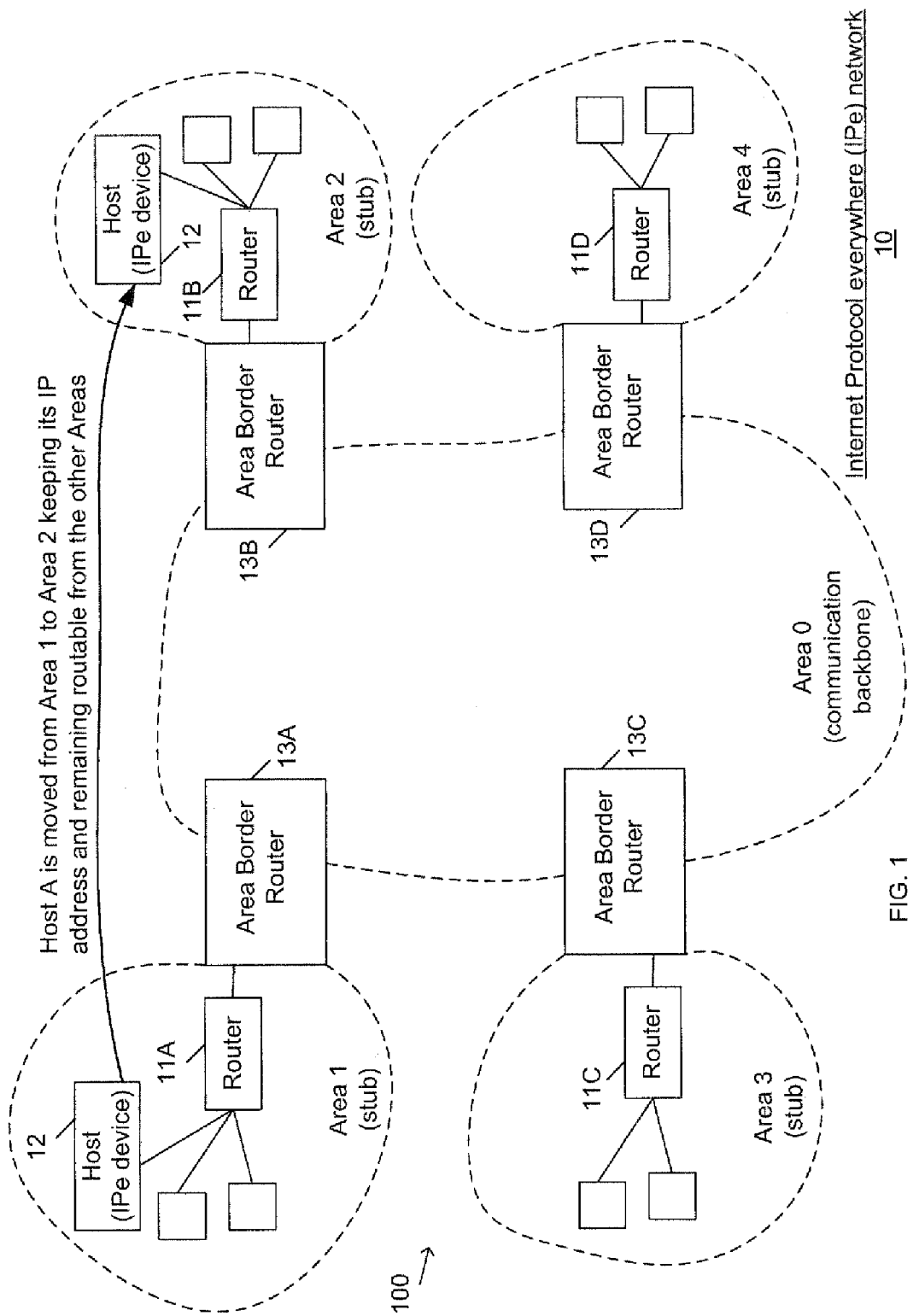
FIG. 1 illustrates a system that extends an Internet Protocol everywhere (IPe) network over a plurality of Open Shortest Path First (OSPF) areas.

In one embodiment, a border node receives a message that includes routing information indicating connection of a network device to a domain. The border node then updates a routing database with the routing information, and also uses a network address for the network device to determine whether to propagate the routing information.

Description

Several preferable examples of the present application will now be described with reference to the accompanying drawings. Various other examples of the invention are also possible and practical. This application may be exemplified in many different forms and should not be construed as being limited to the examples set forth herein.

The figures listed above illustrate preferable examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates a system that extends an Internet Protocol everywhere (IPe) network over a plurality of Open Shortest Path First (OSPF) areas.

The system 100 includes an IPe network 10 that extends over more than one flooding domain (OSPF areas 1-4 in the present example). Intelligent Area Border Routers (ABRs) 13A, 13B, 13C, and 13D are configured to observe routing information messages exchanged between the routers 11A, 11B, 11C, and 11D when a computer connects to one of the areas 1-4. Based on the observed routing information as well as information about a corresponding stub network, the 13A, 13B, 13C, and 13D intelligently determines whether to propagate the routing information contained in the messages. This propagation decision is referred to as intelligent, because it occurs independently of a propagation bit setting indication inserted by the routers 11A, 11B, 11C, and 11D when the messages are generated.

As will be described in more detail with reference to FIGS. 2A and 2B, this intelligent propagation decision by the ABRs 13A, 13B, 13C, and 13D allows IPe devices such as host 12 to remain reachable by devices located in the different areas, particularly when moving between the areas and retaining its IP address. Advantageously, the intelligent propagation decision by the ABRs 13A, 13B, 13C, and 13D allows the non-border routers 11A, 11B, 11C, and 11D to operate according to the same type OSPF procedures when detecting both IPe device connections and non-IPe device connections. As a result, an enterprise that spans an IPe network over more than one flooding domain is able to utilize existing network devices contained in the different areas without being required to reconfigure those existing network devices (or restructuring the boundaries of the areas 1-4) to facilitate the extensive IPe network.

Although the above example shows an IPe host moving between different OSPF areas, it should be apparent that the techniques described herein are applicable to an any IPe device moving between any type of flooding domains. A flooding domain is a group of routers that are all synchronized with the same link-state information. A flooding domain is typically bounded by a portion of the routers for scalability reasons, e.g. so that updating the link-state information does not consume resources across the entire network. These bounding routers may be referred to generally as border routers.

Moreover, the techniques describe herein may be applicable to other devices besides IPe devices. Any type of device that retains its network address after movement within a network may benefit from the techniques described herein.

Figure 2A:
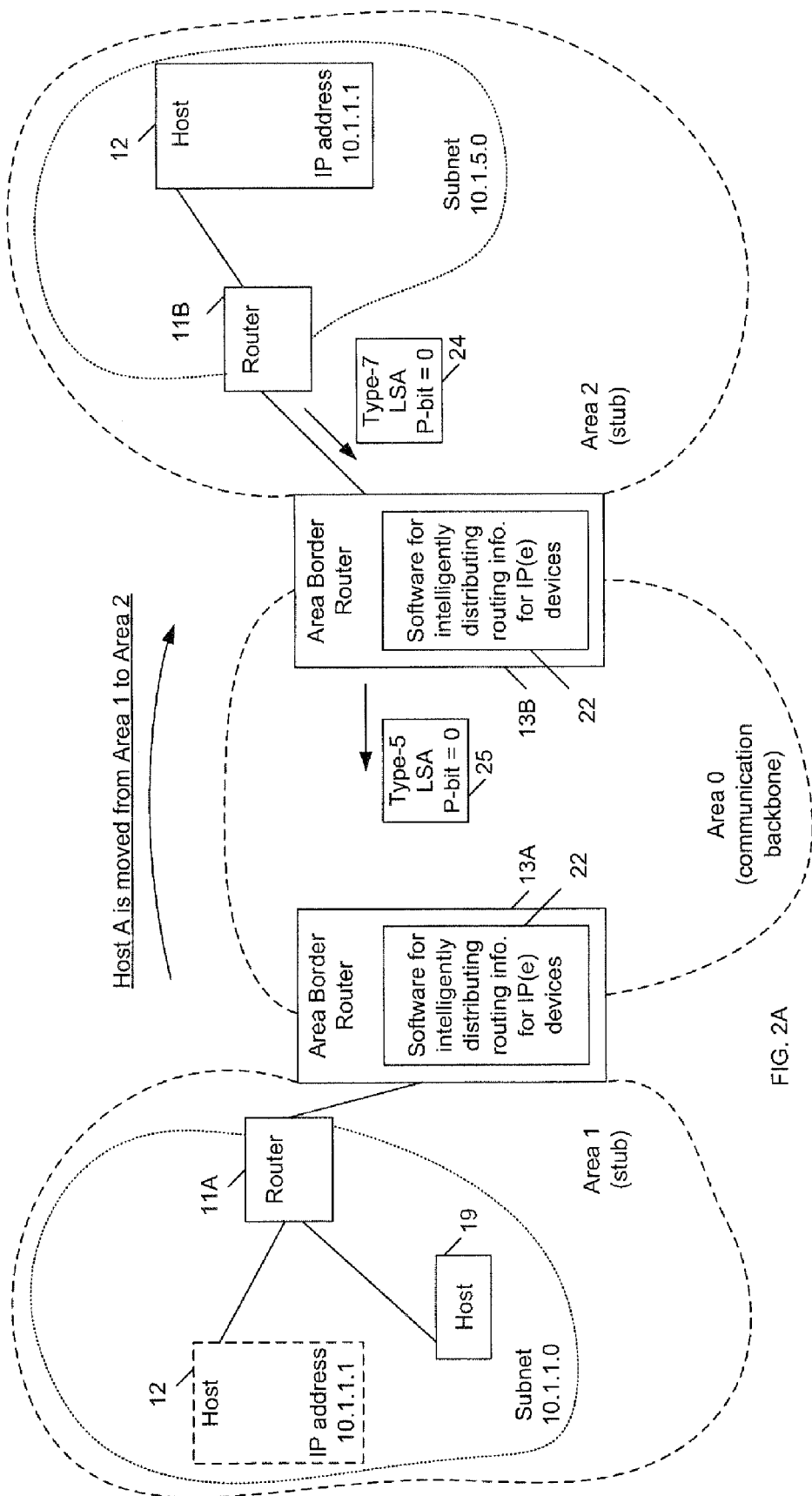
FIG. 2A illustrates one example of how the Area Border Routers (ABRs) shown in FIG. 1 distribute routing information after an IPe device connects to an OSPF area.

FIG. 2A illustrates one example of how the Area Border Routers (ABRs) shown in FIG. 1 distribute routing information after an IPe device connects to an OSPF area.

In the illustrated example, the host 12 is moved from area 1 to area 2. This may occur when a user disconnects a computer from one wall outlet and reconnects the computer to a different wall outlet, or when a laptop with a wireless connection is moved from one portion of an enterprise campus to another portion of the enterprise campus. The host 12 is an IPe device and retains the IP address 10.1.1.1 before and after the move. Prior to the move, the host 12 was reachable by other devices due to the advertisement by router 11A of the internal route for subnet 10.1.1.0/24, to which IP address 10.1.1.1 belongs.

After the move, other nodes located in the area 2 need to learn about the new location of host 12 in order to reach host 12. According to standardized OSPF behavior, router 11B generates a routing information message 24 because the IP address 10.1.1.1 for host 12 is not advertised by router 11B. The routing information message 24 is formatted for advertisement within the local flooding domain 2 such that other routers, including ABR 13B, receive routing information needed to reach host 12 (a type 7 Link State Advertisement (LSA) is used to request such distribution in an OSPF network). To prevent propagation of the routing information over the communication backbone (area 0), the router 11B selects a Propagate bit (P-bit) setting of zero to request that the type 7 LSA 24 is propagated only within the local flooding area 2. A P-bit setting of zero flags the corresponding ABR not to distribute the information contained in the LSA over the communication backbone, whereas a P-bit setting of one flags the corresponding ABR to distribute the information contained in the LSA over the communication backbone.

The router 11B then distributes the type 7 LSA 24 with the P-bit set to zero. It should be apparent that in other networks besides OSPF networks, different mechanisms besides type 7 LSAs and P-bit settings may be used by the router 11B to request distribution of the routing information message 24 only within the local flooding domain 2.

The ABR 13B of area 2 then receives the routing information message 24 and, according to software 22, determines whether the IP address 10.1.1.1 of the newly connected host 12 is contained within a subnet 10.1.5.0 that is located in the local flooding domain 2. When the IP address 10.1.1.1 for host 12 is not contained within the local subnet 10.1.5.0, the software 22 causes the ABR 13B to propagate the routing information over the communication backbone (area 0). In other words, the ABR 13B determines whether to propagate the routing information message 24 external to the flooding domain 2 independently of the P-bit setting and, in effect in this example, contrary to the request from the router 11B. This propagation allows host 12 to remain reachable to other network devices located in the communication backbone.

In the present example utilizing IPe addresses, the ABR 13B determines whether the IP address 10.1.1.1 for host 12 is contained within the local subnet 10.1.5.0 using a subnet mask. First, the ABR 13 determines the network portion of the IP address 10.1.1.1 by converting the IP address 10.1.1.1 from decimal format to binary format and then logically ANDing the binary format address with a binary format of the subnet mask for the local network. The resulting address, when converted to decimal numbers, is referred to as the network portion. Then, the ABR 13B determines whether the network portion matches the subnet address. When the network portion does not match the subnet address, the IP address 10.1.1.1 of the host is not contained within the local subnet. In other examples, any method of determining whether the host address is contained within the local subnet may be used.

After the intelligent propagation decision is made, and when propagation is needed because the host address is not contained within a subnet of the local area 2, the ABR 13B performs any message reformatting needed to propagate the routing information. In the present example utilizing OSPF, this message reformatting involves the ABR 13B translating the type 7 LSA 24 into a type 5 LSA 25, which is a type used for propagation over the communication backbone. The translation is performed according to the processes described in section 3.2 of Request For Comment (RFC) 3101. RFC 3101 is available on the Internet Engineering Task Force (IETF) website and is herein incorporated by reference in its entirety.

Otherwise, when the IP address of the newly connected host is contained within a subnet that corresponds to the local area 2, the ABR 13B updates an internal routing table for area 2 and does not propagate the routing information message 24. In other words, when host movement occurs within a single area, the routing information is not exchanged over the communication backbone thereby realizing scaling benefits of network segmentation.

Once the ABR 13B propagates the type 5 LSA 25 over the communication backbone, host 12 is reachable with respect to other network devices contained in the communication backbone and other network devices that did not rely on internal routes to reach host 12 before the move. As will be explained with reference to FIG. 2B, the intelligent ABR 13A ensures reachability of host 12 to host 19 and other area 1 devices that relied on internal routes for reaching host 12 prior to the movement.

Figure 2B:
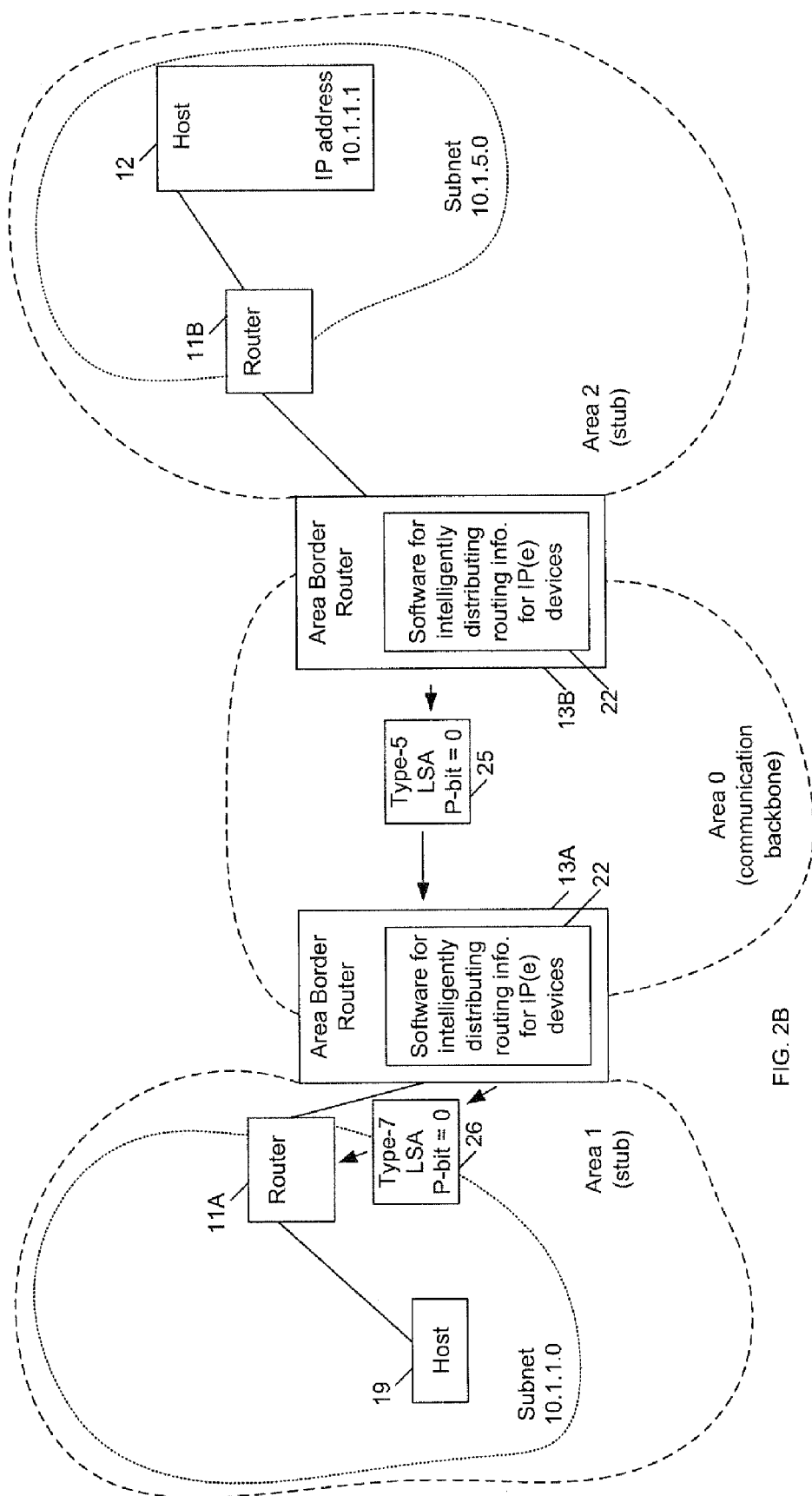
FIG. 2B further illustrates the example of how the ABRs shown in FIGS. 1 and 2A distribute routing information after the IPe device connects to the OSPF area.

FIG. 2B further illustrates the example of how the ABRs shown in FIGS. 1 and 2A distribute routing information after the IPe device connects to the OSPF area.

Continuing the example now with reference to FIG. 2B, ABR 13A receives the type 5 LSA 25. According to software 22, the ABR 13A determines whether the flooding domain (area 1) is synchronized with routing information identifying an internal route to the IP address 10.1.1.1 for the host 12. Here, the area 1 is synchronized with such information because the IP address 10.1.1.1 was advertised by router 11D within the area 1 prior to the movement of host 12. Accordingly, the ABR 13A propagates routing information included in the type 5 LSA 25 to the local domain of area 1.

In other words, when the IP address 10.1.1.1 is contained within a subnet of with the local flooding domain 1, the ABR 13A converts the type 5 LSA 25 into the type 7 LSA 26 for propagation within the local flooding domain 1. Such propagation allows other devices located in the area 1, such as host 19, to reach host 12 at the new location in area 2. Otherwise, the ABR 13A does not propagate the routing information included in the type 5 LSA 25.

Referring now to both FIGS. 1 and 2B, when other intelligent ABRs such as ABRs 13C and 13D receive the type 5 LSA 25, these ABRs 13C and 13D determine that their local flooding domains (areas 3 and 4 respectively) do not include internal routes corresponding to the IP address 10.1.1.1. Accordingly, these ABRs 13C and 13D do not propagate the routing information included in the type 5 LSA 25 into areas 3 and 4. This feature conserves processing resources located in those areas 3 and 4 because non-border devices located in those areas 3 and 4 did not rely on internal routes to reach host 12.

Thus, the IPe host 12 remains reachable to devices located in the areas 1-4 after host 12 moves between flooding areas while retaining its IP address. Moreover, routing information needed to retain reachability for host 12 is distributed in an intelligent and selective manner such that the scaling benefits of defining different logical flooding areas may be realized even when an IPe network extends over different flooding domains.

Figure 3:
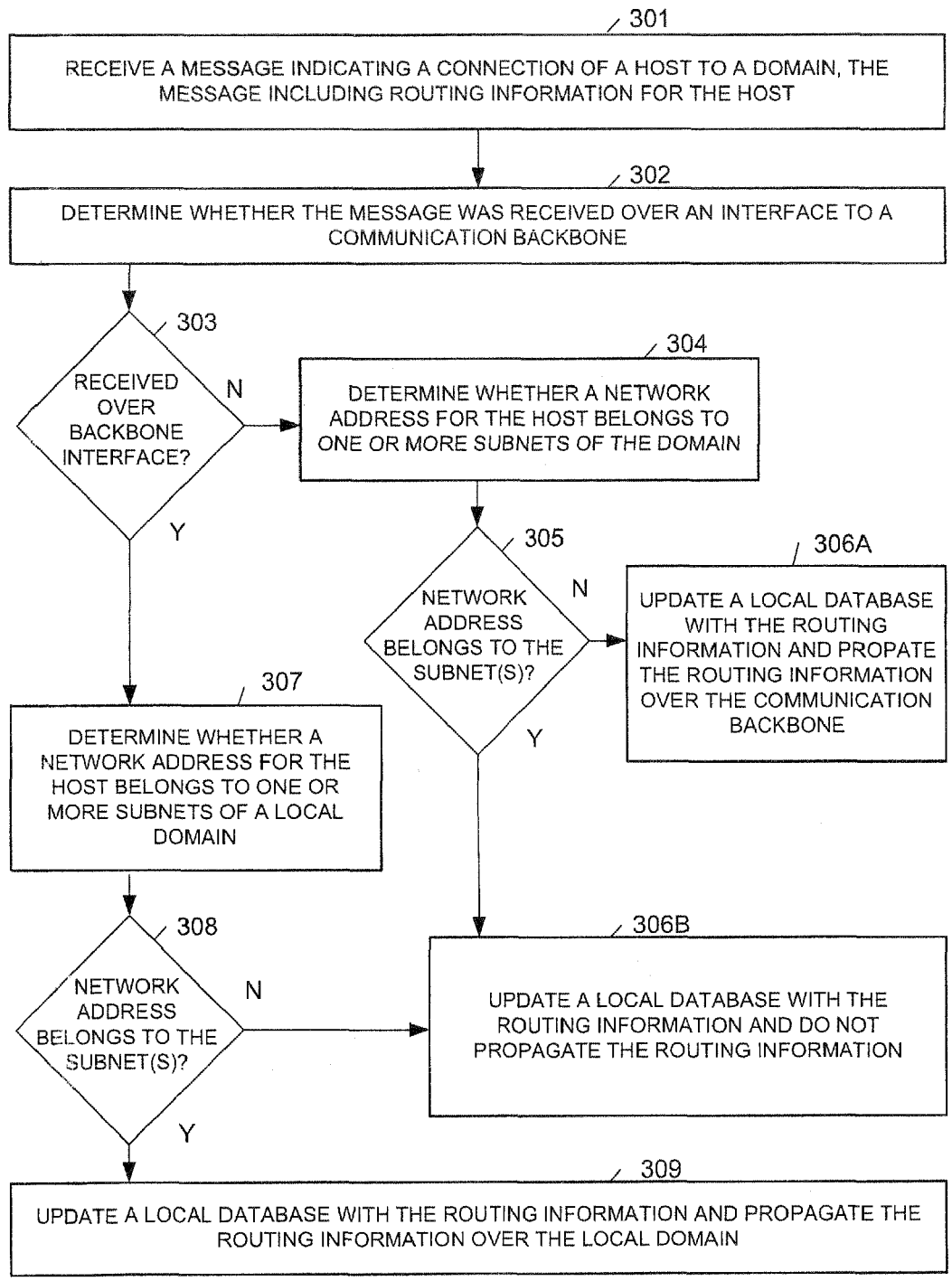
FIG. 3 illustrates an example method for using the ABRs illustrated in FIGS. 2A and 2B.

FIG. 3 illustrates an example method for using the ABRs illustrated in FIGS. 2A and 2B.

In block 301, the ABR receives a message indicating a connection of a host to a domain, the message including routing information for the host. The ABR determines whether the message was received over an interface to a communication backbone in block 302.

When the communication was not received over the communication backbone in decision box 303, in block 304 the ABR determines whether a network address for the host belongs to one or more subnets of the domain. When the network address does not belong to the subnets in decision box 305, in block 306A the ABR updates a local database with the routing information and propagates the routing information over the communication backbone. Otherwise, in block 306B the ABR updates the local database with the routing information and does not propagate the routing information. Although this subnet check is one technique determining whether a remote flooding domain includes local routes that require updating with the routing information, any other technique may be used.

When the communication was received from the communication backbone in decision box 303, in block 307 the ABR determines whether a network address for the host belongs to one or more subnets of a local domain, such as an adjacent stub network. When the network address does belong to the subnets in decision box 308, in block 309 the ABR updates a local database with the routing information and propagates the routing information over the local domain. Otherwise, in block 306B the ABR updates the local database with the routing information and does not propagate the routing information. Although this subnet check is one technique of determining whether an adjacent flooding domain includes local routes to this host and needs to be updated with the routing information, any other technique may be used.

Several preferable examples have been described above with reference to the accompanying drawings. Various other examples of the invention are also possible and practical. The system may be exemplified in many different forms and should not be construed as being limited to the examples set forth above.

The figures listed above illustrate preferable examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the alt.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferable embodiment thereof, it should be apparent that the invention may be modified in arrangement and detail without departing from such principles. I claim all modifications and variation coming within the spirit and scope of the following claims.

The invention claimed is:

1. An article of manufacture including a non-transitory computer-readable medium having instructions stored thereon that, in response to execution by a computing device, cause the computing device to perform operations comprising:
   receiving a message indicating a connection of a host to a first flooding domain, the message including routing information for the host, wherein the routing information is encapsulated in a first Open Shortest Path First (OSPF) message type;
   wherein the message is formatted to prevent propagation of the routing information outside the first flooding domain or formatted to prevent propagation of the routing information outside a communication backbone coupling the first flooding domain and a second different flooding domain;
   translating the first OSPF message type into a second different OSPF message type according to whether an Internet Protocol (IP) address included in the routing information belongs to a particular subnet; and
   if the first OSPF message type is translated into the second different OSPF message type, then transferring the routing information encapsulated in the second OSPF message type over the second flooding domain or over the communication backbone.

2. The article of manufacture of claim 1, wherein the first and second flooding domains are different OSPF areas, and a single Internet Protocol everywhere (IPe) domain extends across both of the flooding domains.

3. The article of manufacture of claim 2, wherein the host is an IPe device and the propagation of the routing information allows nodes located in the second flooding domain to reach the IPe device.

4. The article of manufacture of claim 1, wherein the operations further comprise translating a type 7 Link State Advertisement (LSA) having a Propagate bit (P-bit) setting requesting no advertisement over the communication backbone into a type 5 LSA for advertisement over the communication backbone.

5. The article of manufacture of claim 1, wherein the operations further comprise:
   translating the first OSPF message type into the second different OSPF message type when the IP address included in the routing information does not belong to a subnet associated with the first flooding domain; and
   transferring the routing information encapsulated in the second OSPF message type over the communication backbone.

6. The article of manufacture of claim 5, wherein the computing device operates in a network device that borders the first flooding domain.

7. The article of manufacture of claim 1, wherein the operations further comprise:
   translating the first OSPF message type into the second different OSPF message type when the IP address included in the routing information belongs to a subnet associated with the second flooding domain; and
   transferring the routing information encapsulated in the second OSPF message type over the second flooding domain.

8. The article of manufacture of claim 7, wherein the computing device operates in a network device that is located between the second flooding domain and the communication backbone.

9. A method, comprising:
- receiving a message indicating a connection of a host to a first flooding domain, the message including routing information for the host;
- wherein the message is formatted to prevent propagation of the routing information outside the first flooding domain or formatted to prevent propagation of the routing information outside a communication backbone coupling the first flooding domain and a second different flooding domain;
- determining whether a network address associated with the message belongs to a particular subnet;
- reformatting the message for transfer over the second flooding domain or over the communication backbone, said reformatting being performed according to whether the network address belongs to the particular subnet; and
- if the message is reformatted, transferring the reformatted message including the routing information over the second flooding domain or the communication backbone.

10. The method of claim 9, wherein the message is formatted with a Propagate bit (P-bit) setting of zero to request no propagation of the routing information outside the first flooding domain, and the method further comprises:
- determining whether the network address associated with the message belongs to a subnet of the first flooding domain; and
- reformatting the message for transfer over the communication backbone if the network address does not belong to the first flooding domain subnet.

11. The method of claim 9, wherein the message is formatted to prevent propagation of the routing information outside the communication backbone, and the method further comprises:
- determining whether the network address associated with the message belongs to a subnet of the second flooding domain; and
- reformatting the message for transfer over the second flooding domain if the network address does belong to the second flooding domain subnet.

12. The method of claim 9, wherein the host is an Internet Protocol everywhere (IPe) device and the method further comprises:
- disconnecting the host from a first stub network associated with the first flooding domain; and
- connecting the host to a second different stub network without reconfiguring an Internet Protocol (IP) address for the host;
- wherein the propagation of the routing information provides reachability to the host from nodes located in the first stub network.

13. The method of claim 10, further comprising translating an Open Shortest Path First (OSPF) type 5 message into an OSPF type 7 message during propagation of the routing information.

14. The method of claim 11, further comprising translating an OSPF type 7 message into an OSPF type 5 message during propagation of the routing information.

15. An apparatus, comprising:
- means for receiving a message indicating a connection of a host to a flooding domain, the message including routing information for the host and indicating whether propagation of the routing information is requested, wherein the message is formatted to prevent propagation of the routing information outside the flooding domain;
- means for determining whether a network address associated with the message belongs to a subnet of the flooding domain;
- means for reformatting the message for transfer over a communication backbone and outside the flooding domain if the network address does not belong to the subnet; and
- means for propagating the reformatted message having the routing information.

16. The apparatus of claim 15, further comprising means for translating an Open Shortest Path First (OSPF) type 5 message into an OSPF type 7 message according to a comparison of an Internet Protocol (IP) address to the subnet.

17. An apparatus, comprising:
- means for receiving a message indicating a connection of a host to a first flooding domain, the message including routing information for the host and indicating whether propagation of the routing information is requested, wherein the message is formatted to prevent propagation of the routing information outside the first flooding domain;
- means for determining whether a network address associated with the message belongs to a subnet of a second local flooding domain;
- means for reformatting the message for transfer outside a communication backbone and to the second flooding domain if the network address does belong to the subnet; and
- means for propagating the reformatted message having the routing information.

18. The apparatus of claim 17, further comprising means for translating an OSPF type 7 message into an OSPF type 5 message according to a comparison of an Internet Protocol (IP) address to the subnet.

* * * * *